(12) United States Patent  
MacKinnon

(10) Patent No.: US 10,686,548 B2  
(45) Date of Patent: Jun. 16, 2020

(54) PROJECTION OF MULTIPLE BEAMS USING CYLINDRICAL LENSES

(71) Applicant: Apple Inc., Cupertino, CA (US)

(72) Inventor: Neil MacKinnon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/544,972

(22) Filed: Aug. 20, 2019

(65) Prior Publication Data

US 2019/0372700 A1 Dec. 5, 2019

Related U.S. Application Data

(63) Continuation of application No. 16/179,951, filed on Nov. 4, 2018.

(60) Provisional application No. 62/618,640, filed on Jan. 18, 2018.

(51) Int. Cl.

| | |
|---|---|
| *G02B 27/28* | (2006.01) |
| *G02B 27/09* | (2006.01) |
| *H04J 14/06* | (2006.01) |
| *H04B 10/25* | (2013.01) |
| *H04J 14/04* | (2006.01) |
| *H04B 10/50* | (2013.01) |
| *G02B 19/00* | (2006.01) |
| *F21V 9/14* | (2006.01) |

(52) U.S. Cl.
CPC ............... *H04J 14/06* (2013.01); *F21V 9/14* (2013.01); *G02B 19/0014* (2013.01); *G02B 19/0057* (2013.01); *G02B 27/0911* (2013.01); *G02B 27/0966* (2013.01); *G02B 27/283* (2013.01); *G02B 27/285* (2013.01); *H04B 10/2504* (2013.01); *H04B 10/505* (2013.01); *H04J 14/04* (2013.01)

(58) Field of Classification Search
CPC ........................... G02B 27/283; G02B 27/285
See application file for complete search history.

(56) References Cited

U.S. PATENT DOCUMENTS

| | | | | |
|---|---|---|---|---|
| 5,646,928 | A | * | 7/1997 | Wu ................. G02B 6/122 359/362 |
| 2005/0178950 | A1 | | 8/2005 | Yoshida |
| 2016/0161752 | A1 | * | 6/2016 | Negoita ............ G02B 27/1006 359/572 |
| 2016/0373704 | A1 | * | 12/2016 | Akiyama ............. H04N 9/3152 |

OTHER PUBLICATIONS

U.S. Appl. No. 16/045,779 office action dated Oct. 10, 2019.

* cited by examiner

*Primary Examiner* — Nathan M Cors

(74) *Attorney, Agent, or Firm* — Kligler & Associates Patent Attorneys Ltd

(57) ABSTRACT

An optoelectronic apparatus includes an array of emitters configured to emit respective beams of optical radiation. Projection optics include first cylindrical lenses, which have respective, mutually-parallel first cylinder axes, and are aligned respectively with the emitters in the array so as to receive and project the respective beams, and a second cylindrical lens, which has a second cylinder axis perpendicular to the first cylinder axes and is positioned adjacent to the first cylindrical lenses so as to receive and project all of the beams from the first cylindrical lenses.

8 Claims, 5 Drawing Sheets

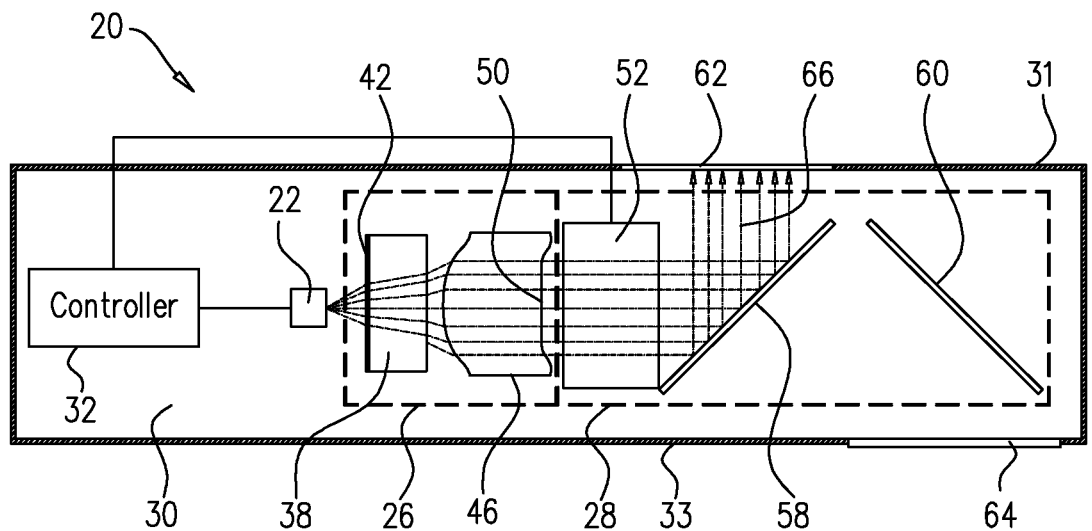
FIG. 1A
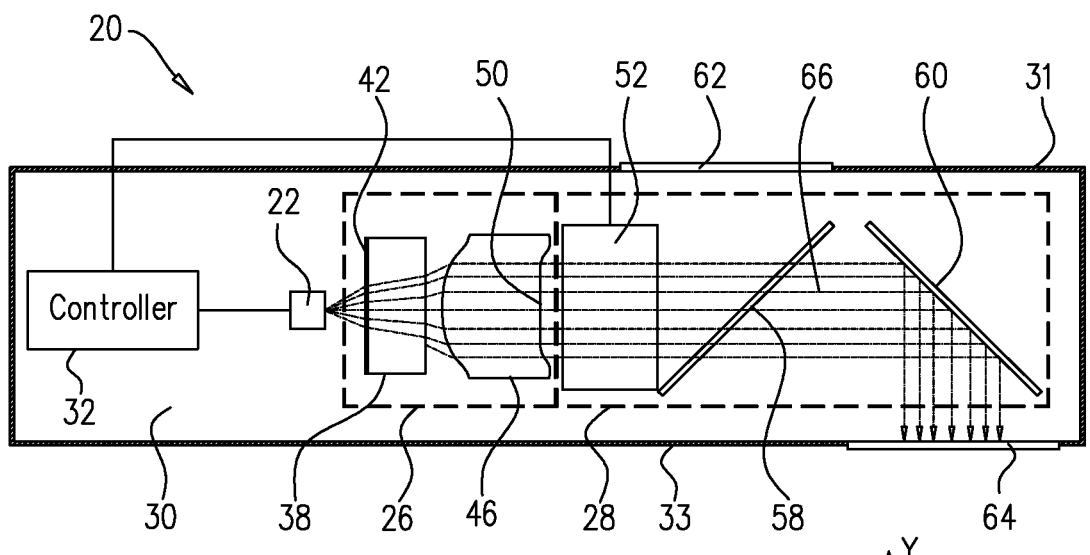
FIG. 1B
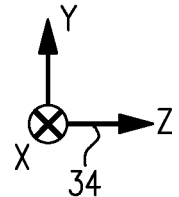

PROJECTION OF MULTIPLE BEAMS USING CYLINDRICAL LENSES

CROSS-REFERENCE TO RELATED APPLICATION

This application is a continuation of U.S. patent application Ser. No. 16/179,951, filed Nov. 4, 2018, which claims the benefit of U.S. Provisional Patent Application 62/618,640, filed Jan. 18, 2018, which is incorporated herein by reference.

FIELD OF THE INVENTION

The present invention relates generally to optoelectronic systems, and particularly to illumination devices.

BACKGROUND

Portable electronic devices, such as cellular phones, commonly employ one or more integral light sources. These light sources may provide illumination for a scene recorded by a camera integrated into the device. As an example, U.S. Pat. No. 9,400,177 describes a pattern projector, including a light source, configured to emit a beam of light. The inventors describe a system for 3D mapping, which may be produced as a very compact unit, for example being included in a mobile station (e.g., PDA, cellular phone) and/or a portable computer.

SUMMARY

Embodiments of the present invention that are described herein provided improved sources of optical radiation.

There is therefore provided, in accordance with an embodiment of the invention, an optoelectronic apparatus, including an enclosure including mutually-opposing first and second faces. An array of emitters contained in the enclosure is configured to emit beams of optical radiation. Projection optics contained in the enclosure have an entrance face and an exit face and are configured to receive the beams of optical radiation through the entrance face and to project the beams through the exit face. A polarization-based spatial multiplexer is contained in the enclosure and positioned to intercept and direct the projected beams such that the optical radiation having a first polarization is transmitted through the first face, while the optical radiation having a second polarization, orthogonal to the first polarization, is emitted through the second face. A controller is coupled to control a polarization of the optical radiation and thereby control a direction in which the optical radiation is emitted from the enclosure.

In some embodiments, the polarization-based spatial multiplexer includes a polarizing beamsplitter configured to reflect the beams with a first polarization toward the first face of the enclosure and to transmit the beams with the second polarization. In a disclosed embodiment, the polarization-based spatial multiplexer includes a mirror positioned to intercept the beams with the second polarization transmitted by the polarizing beamsplitter and to reflect the intercepted beams toward the second face of the enclosure. The mirror may be configured to transmit a portion of the intercepted beams, and the apparatus may include an optical sensor positioned to intercept the portion of the beams and configured to emit a signal to the controller responsively to an optical power of the portion of the intercepted beams.

In other embodiments, the emitters are configured to emit beams with a common polarization, and the polarization-based spatial multiplexer includes a polarization switcher configured to rotate the polarization of the beams between the first and second polarizations under control of the controller. In one embodiment, the polarization switcher includes a liquid crystal cell.

In a disclosed embodiment, the emitters include edge-emitting laser diodes.

In some embodiments, the array of emitters includes first emitters, which are configured to emit respective first beams of optical radiation of the first polarization, and second emitters, which are configured to emit respective second beams of optical radiation of the second polarization. In a disclosed embodiment, the controller is coupled to drive the first emitters and the second emitters either separately or concurrently so that the polarization-based spatial multiplexer projects the beams of optical radiation through either the first face or the second face or through both faces of the enclosure.

In a disclosed embodiment, the projection optics include first cylindrical lenses, which are aligned respectively with the emitters in the array and have respective, mutually-parallel first cylindrical axes, and a second cylindrical lens positioned adjacent to the first cylindrical lenses and having a second cylindrical axis perpendicular to the first cylindrical axes.

There is also provided, in accordance with an embodiment of the invention, an optoelectronic apparatus, including an array of pairs of first and second emitters, wherein the first emitters are configured to emit respective first beams of optical radiation of a first polarization, and the second emitters are configured to emit respective second beams of optical radiation of a second polarization orthogonal to the first polarization. Projection optics having an entrance face and an exit face are configured to receive the first and second beams of the optical radiation through the entrance face and to project the beams through the exit face. A polarizing beamsplitter is positioned to intercept the projected beams and configured to transmit the optical radiation of the first polarization and to reflect the optical radiation of the second polarization.

In some embodiments, the projection optics are configured to provide a uniform illumination. Alternatively, the projection optics are configured to provide a patterned illumination.

In one embodiment, the apparatus includes a controller, which is coupled to drive the first and second emitters so as to set relative proportions of the optical radiation that are transmitted and reflected.

There is additionally provided, in accordance with an embodiment of the invention, a method for projecting optical radiation, which includes providing an enclosure including mutually-opposing first and second faces, containing an array of emitters configured to emit beams of optical radiation and projection optics having an entrance face and an exit face and configured to receive the beams of optical radiation through the entrance face and to project the beams through the exit face. A polarization-based spatial multiplexer is positioned to intercept and direct the projected beams such that the optical radiation having a first polarization is transmitted through the first face, while the optical radiation having a second polarization, orthogonal to the first polarization, is emitted through the second face. A polarization of the optical radiation is controlled, thereby controlling the direction in which the optical radiation is emitted from the enclosure.

The present invention will be more fully understood from the following detailed description of the embodiments thereof, taken together with the drawings in which:

BRIEF DESCRIPTION OF THE DRAWINGS

FIGS. 1A-B and 1C-D are schematic sectional side views and schematic top views, respectively, of an optoelectronic apparatus in two alternative polarization configurations, in accordance with an embodiment of the invention;

DETAILED DESCRIPTION OF EMBODIMENTS

Figure 1C:
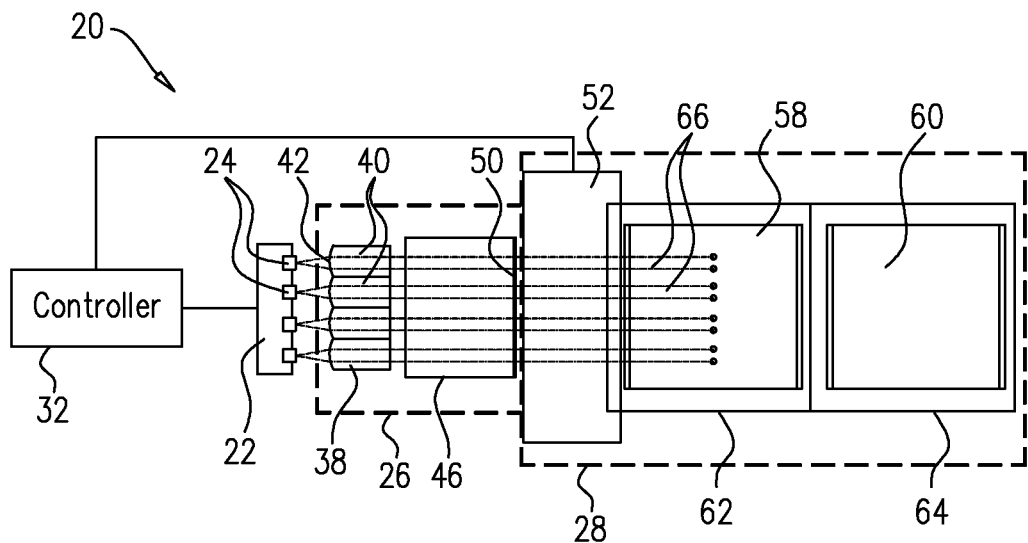

A portable electronic device may employ more than one light source for providing illumination for sub-systems integral to the device, such as front- and rear-side cameras. Realizing these light sources and their switching mechanisms within the constraints of volume and cost of a typical portable electronic device, such as a cellular phone, is challenging.

Embodiments of the present invention that are described herein address these problems by providing a compact optoelectronic apparatus featuring a spatially multiplexed light source.

In the disclosed embodiments, the optoelectronic apparatus includes an enclosure, with an array of emitters of beams of optical radiation, projection optics, a polarization-based spatial multiplexer, and a controller contained in the enclosure. (The terms "optical radiation" and "light" as used in the present description and in the claims refer generally to any and all of visible, infrared, and ultraviolet radiation.)

The projection optics are common to all of the emitted beams, and in some embodiments include an array of first cylindrical lenses with mutually parallel first cylinder axes and a second cylindrical lens, adjacent to the array of first cylindrical lenses, with a second cylinder axis perpendicular to the first axes. Depending on the optical parameters, this arrangement can be used to create uniform flood lighting or patterned radiation over the field of interest.

The beams of optical radiation emitted by the array of emitters are received by the projection optics and projected toward the polarization-based spatial multiplexer. The polarization-based spatial multiplexer directs the beams, depending on their state of polarization, to be emitted through the front face or the rear face of the enclosure, or through both of the faces.

The beams emitted through the front or rear faces may have different functionalities. For instance, the beams emitted through the front face may project patterned illumination onto a scene, enabling 3D mapping based on triangulation, whereas a scanner may be added to scan the beams emitted through the rear face, enabling 3D mapping based on time-of-flight (TOF). Alternatively or additionally, the beams may be used for other purposes, such as uniform flood lighting.

In an embodiment of the present invention, the emitters, driven by a controller, emit beams of polarized light. These emitters may be, for example, edge-emitting laser diodes, which typically emit polarized light, or unpolarized sources, such as surface-emitting devices, overlaid by a polarizer. Each first cylindrical lens of the lens array receives one emitted beam and projects it toward the second cylindrical lens, which, in turn, projects all the beams toward the polarization-based spatial multiplexer. The polarization-based spatial multiplexer includes a polarization switcher, such as a liquid crystal cell, and a polarizing beamsplitter. A mirror, either free standing or embedded in a cube, can be included for deflecting the beams that are transmitted through the beamsplitter. The polarization switcher, driven by the controller, transmits the beams and imposes on them a desired polarization state. The polarizing beamsplitter receives the transmitted beams, and, depending on their polarization state, reflects, transmits, or both reflects and transmits them. The reflected beams are emitted through one face of the enclosure, for example the front face. The transmitted beams impinge on and are reflected by the mirror, and are thus emitted through the opposite face of the enclosure, for example the rear face.

In the present description, the terms "front face" and "rear face" are used by way of example only, and in general can denote any two opposing faces of the enclosure. Furthermore, although some of the embodiments described herein are particularly well suited for integration in a narrow enclosure as described above, the principles of the present invention may also be applied to provide polarization-based spatial multiplexing in other settings, irrespective of any particular type of enclosure.

In an alternative embodiment the array of emitters includes first emitters emitting beams of optical radiation of a first polarization and second emitters emitting beams of optical radiation of a second polarization, orthogonal to the first polarization. Each first cylindrical lens of the lens array receives one beam of each polarization and projects them toward the second cylindrical lens, which, in turn, projects the beams toward the polarization-based spatial multiplexer.

As in the preceding embodiment, the polarization-based spatial multiplexer includes a polarizing beamsplitter and a mirror. In this embodiment, however, the polarization switching is performed by the controller driving either the first or the second emitters or both. Therefore, a separate polarization switcher is not required. The beams projected by the projection optics impinge on the polarizing beamsplitter, which operates as described above, so that beams can be directed through either the front face, rear face, or both faces of the enclosure.

In a further embodiment, the mirror of the polarization-based spatial multiplexer is configured to transmit a portion of the optical radiation impinging on it. An optical sensor receives this transmitted portion of the optical radiation, and emits a signal that can be used, for example, for measuring the optical power of the beams transmitted by the polarizing beamsplitter or, if in a scanning system, the relative position of the optical output.

Figure 1D:
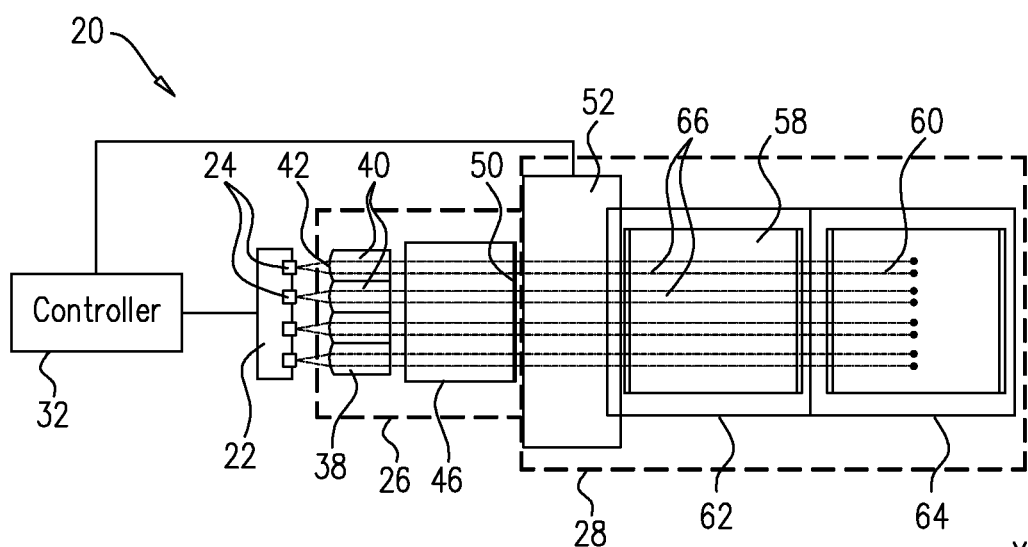

FIGS. 1A-B and 1C-D are schematic sectional side views and schematic top views, respectively, of an optoelectronic apparatus 20 in two alternative polarization configurations, in accordance with an embodiment of the invention. FIG. 1C is a top view of the configuration of FIG. 1A, and FIG. 1D is a top view of the configuration of FIG. 1D. Optoelectronic apparatus 20 includes an emitter array 22, projection optics 26, a polarization-based spatial multiplexer 28, an enclosure 30, and a controller 32. Enclosure 30 has a front face 31 and a rear face 33. For the sake of simplicity, enclosure 30 is omitted from FIGS. 1C-D. In addition, any actuating mechanisms that would be provided to scan the optical output are likewise omitted for clarity.

Emitter array 22 includes emitters 24 arranged along the x-axis of Cartesian coordinate axes 34, which are shown for reference next to FIGS. 1A-B and FIGS. 1C-D, respectively. Emitters 24 emit beams of optical radiation with a common polarization and with the z-axis as the principal direction of emission. Projection optics 26 include a lens array 38 of first cylindrical lenses 40, wherein the entrance faces of the first cylindrical lenses define an entrance face 42 of projection optics 26. First cylindrical lenses 40 are oriented so that their cylinder axes are mutually parallel along the y-axis (perpendicular to the line of emitters 24). Projection optics 26 further include a second cylindrical lens 46, whose exit face defines an exit face 50 of projection optics 26. Second cylindrical lens 46 is positioned adjacent to lens array 38, and oriented with its cylinder axis along the x-axis (perpendicular to the cylinder axes of first cylindrical lenses 40).

Polarization-based spatial multiplexer 28 includes a polarization switcher 52, which is positioned adjacent to second cylindrical lens 46. Polarization switcher 52 may comprise, for example, a liquid crystal cell, which applies an electrically-switchable rotation of polarization to the incident beams. Polarization-based spatial multiplexer 28 further includes a polarizing beamsplitter 58, positioned adjacent to polarization switcher 52 and oriented typically at an angle of 45 degrees with respect to the z-axis. Polarization-based spatial multiplexer 28 also includes a mirror 60, positioned adjacent to polarizing beamsplitter 58 and oriented typically at an angle of −45 degrees with respect to the z-axis, i.e., in a direction perpendicular to that of the polarizing beamsplitter in the present example.

Enclosure 30 has a first exit window 62 adjacent to polarizing beamsplitter 58 and a second exit window 64 adjacent to mirror 60. Exit windows 62 and 64 are manufactured of a material that is transparent to the emission spectrum of emitters 24. Alternatively, exit windows 62 and 64 may simply be openings in enclosure 30.

Controller 32 is coupled to and drives both emitter array 22 and polarization switcher 52. Although controller 32 is shown in FIGS. 1A-B to be positioned inside enclosure 30, it may alternatively be positioned outside the enclosure. In some embodiments, the controller is programmed in software and/or firmware to carry out the functions that are described herein. Additionally or alternatively, at least some of the functions of the controller may be carried out by hardware logic circuits, which may be hard-wired or programmable. In either case, the controller has suitable interfaces for receiving and transmitting data and instructions to and from other elements of the optoelectronic apparatus, as well as other apparatus with which the optoelectronic apparatus is integrated.

The functioning of optoelectronic apparatus 20 is shown schematically in FIGS. 1A-D by optical rays 66 denoting the beams of optical radiation emitted by emitters 24 and passed through the apparatus. Each beam emitted by an emitter 24 is received by one first cylindrical lens 40 in lens array 38. First cylindrical lenses 40 collimate the beams in the x-direction and project them toward second cylindrical lens 46, which in turn collimates the beams in the y-direction and projects them toward polarization switcher 52. Polarization switcher 52 imposes on the beams a common polarization state determined by controller 32, and passes the beams to polarizing beamsplitter 58. Depending on the polarization state of the beams, polarizing beamsplitter 58 either reflects, transmits or partially reflects and partially transmits the beams. The reflected beams are emitted through first exit window 62, whereas the transmitted beams are reflected by mirror 60 and emitted through second exit window 64.

Figure 2A:
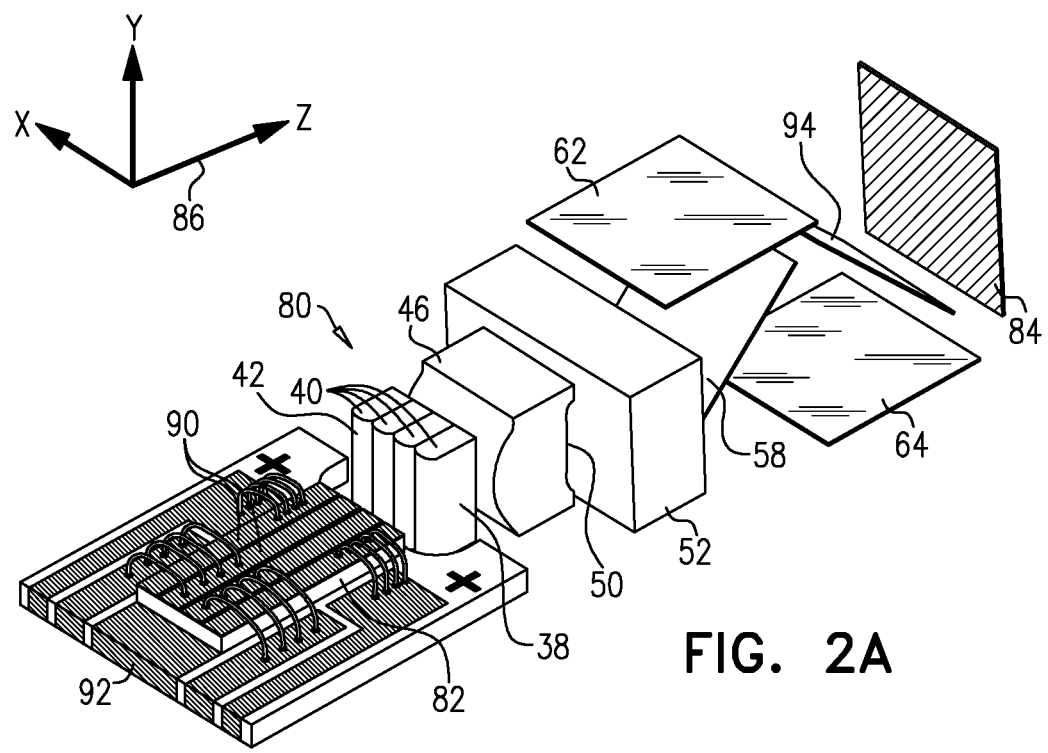
FIGS. 2A-B are schematic perspective and side views, respectively, of an optoelectronic apparatus, in accordance with another embodiment of the invention.
Figure 2B:
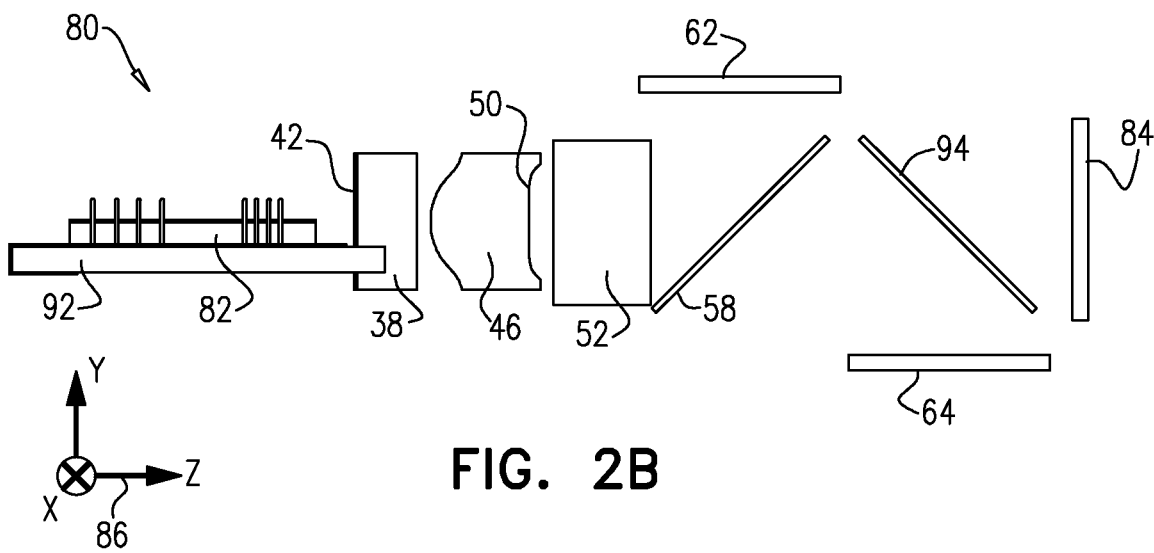

FIGS. 2A-B are a two views of a schematic solid model of an optoelectronic apparatus 80, in accordance with another embodiment of the invention. FIG. 2A is a perspective view of optoelectronic apparatus 80, and FIG. 2B is a side view of the same apparatus. Optoelectronic apparatus 80 is similar to optoelectronic apparatus 20 of FIGS. 1A-D, with the addition of an emitter array 82 and a partially-transmitting mirror 94, in place of mirror 60, with an optical sensor 84 added behind the partially-transmitting mirror. For the components substantially identical to those in FIGS. 1A-D, the same labels are used. Cartesian coordinate axes 86 are shown for reference next to FIG. 2A and FIG. 2B, respectively.

Emitter array 82, comprising emitters 90, is assembled on a substrate 92, such as a printed-circuit board or silicon optical bench. Emitters 90 are typically edge-emitting laser diodes, which are inherently polarized. Controller 32 of FIGS. 1A-D is not shown in FIGS. 2A-B, but may be integrated onto substrate 92.

The functional description of optoelectronic apparatus 80 is identical to that of optoelectronic apparatus 20, above, except that a portion of the beams impinging on mirror 94 is transmitted by the mirror and received by optical sensor 84. Optical sensor 84 is typically coupled to controller 32, and may be used, for example, for measuring and regulating the power emitted by emitters 90.

Figure 3:
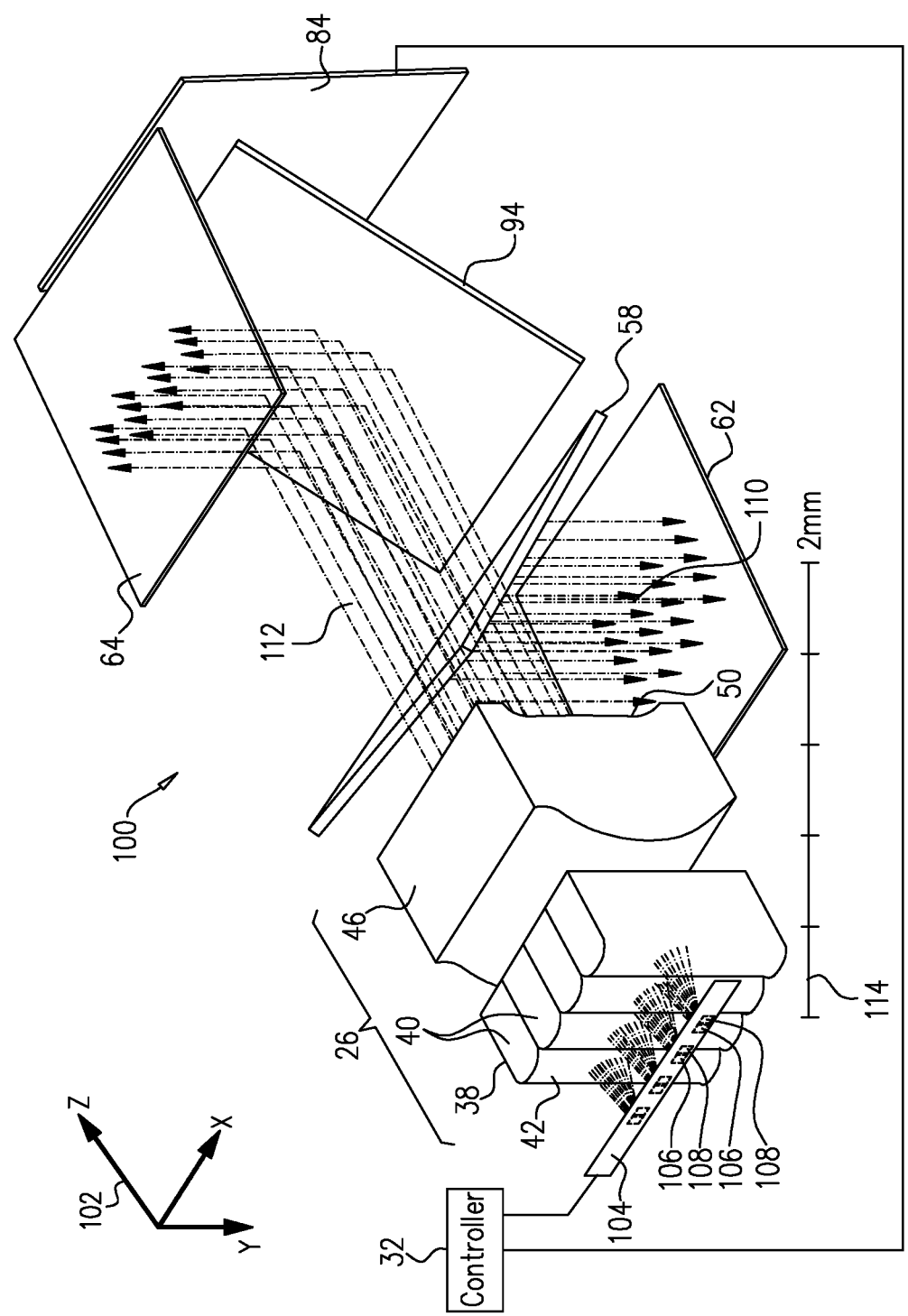
FIG. 3 is a schematic perspective illustration of an optoelectronic apparatus, in accordance with yet another embodiment of the invention.

FIG. 3 is a schematic perspective illustration of an optoelectronic apparatus 100, in accordance with yet another embodiment of the invention. For the components substantially identical to those in FIGS. 1A-D and 2A-B, the same labels are used. Cartesian coordinate axes 102 are shown for reference. Cartesian coordinate axes 102 have been rotated by 180 degrees around the z-axis as compared to Cartesian coordinate axes 86 of FIG. 2A to follow the 180 degree rotation the optics of optical apparatus 100 relative to the orientation of optical apparatus 80.

Optoelectronic apparatus 100 includes an emitter array 104 of first emitters 106 and second emitters 108. First emitters 106 emit optical radiation linearly polarized in the x-direction, and second emitters 108 emit optical radiation linearly polarized in the y-direction. Both first emitters 106 and second emitters 108 are positioned in emitter array 104 along a line in the x-direction, with alternating first and second emitters, forming pairs of first and second emitters so that each pair is aligned with one cylindrical lens 40. Emitters 106 and 108 may comprise, for example, edge-emitting lasers with perpendicular orientations or, alternatively, surface-emitting lasers with suitable polarizers.

Optoelectronic apparatus 100 further includes projection optics 26, including (as in FIGS. 2A-B) lens array 38 of first cylindrical lenses 40 and second cylindrical lens 46, with the cylinder axes of the first cylindrical lenses and the second cylindrical lens oriented, respectively, in the y- and x-directions. (For the sake of simplicity, the outlines of projection optics 26 are not shown in FIG. 3.) As in FIGS. 1A-D and 2A-B, the entrance faces of first cylindrical lenses 40 define entrance face 42 of projection optics 26, and the exit face of second cylindrical lens 46 defines exit face 50 of the projection optics.

Optoelectronic apparatus 100 also includes a polarization-based spatial multiplexer including polarizing beamsplitter 58 and partially transmitting mirror 94. Optical sensor 84 is positioned adjacent to partially transmitting mirror 94. Controller 32, coupled to emitter array 104 and optical sensor 84, drives first and second emitters 106 and 108 separately or simultaneously, and receives signals emitted by the optical sensor.

The functioning of optoelectronic apparatus 100 is shown schematically in FIG. 3, with optical rays 110 and 112 denoting the beams of optical radiation emitted by first and second emitters 106 and 108, respectively, and projected by the apparatus. The beams are received through entrance face 42, with each first cylindrical lens 40 receiving one beam from one first emitter 106 and one beam from one second emitter 108. Projection optics 26 collimate the beams in the x- and y-directions as in FIGS. 1A-D, and project them through exit face 50 toward polarizing beamsplitter 58. Beams from first emitters 106, depicted by optical rays 110, are reflected by polarizing beamsplitter 58 to first exit window 62 and are emitted through the window. Beams from second emitters 108, depicted by optical rays 112, are transmitted by polarizing beamsplitter 58 and reflected by partially transmitting mirror 94 to second exit window 64 and are emitted through the window. A portion of rays 112 passes through partially transmitting mirror 94 and is received by optical sensor (transmitted rays not shown). Optical sensor 84, coupled to controller 32, may be used, for example, for measuring the power emitted by second emitters 108.

When controller 32 energizes only first emitters 106, only rays 110 are present, and optical radiation is emitted only through first exit window 62. Similarly, when controller 32 energizes only second emitters 108, only rays 112 are present, and optical radiation is emitted only through second exit window 64.

The compact size of optoelectronic apparatus 100 is indicated by a scale 114, wherein the length of the scale is 2 mm. Alternatively, the elements of apparatus 100 may be made to a larger or smaller scale, depending on application requirements.

Figure 4:
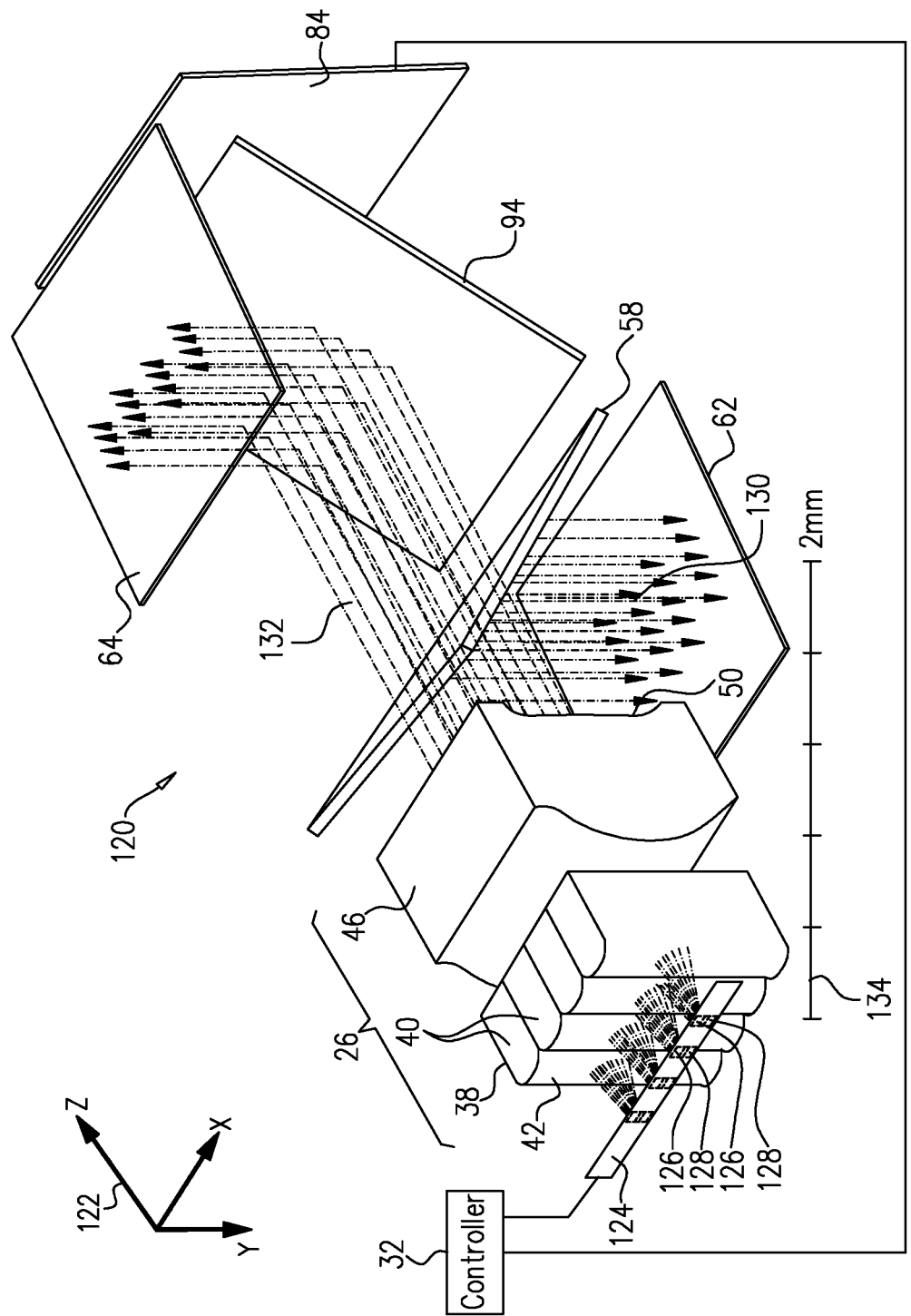
FIG. 4 is a schematic perspective illustration of an optoelectronic apparatus, in accordance with still another embodiment of the invention.

FIG. 4 is a schematic perspective illustration of an optoelectronic apparatus 120, in accordance with still another embodiment of the invention. For the components substantially identical to those in FIG. 3, the same labels are used. Cartesian coordinate axes 122, rotated similarly to Cartesian coordinate axes 102, are shown for reference.

Optoelectronic apparatus 120 includes an emitter array 124 of first emitters 126 and second emitters 128. First emitters 126 emit optical radiation linearly polarized in the x-direction, and second emitters 128 emit optical radiation linearly polarized in the y-direction. First emitters 126 and second emitters 128 are positioned, respectively, along two parallel straight lines in the x-direction, with each first emitter 126 aligned above a second emitter 128 in the y-direction, forming pairs of first and second emitters so that each pair is aligned with one cylindrical lens 40. The remaining elements of apparatus 120 are similar to those shown and described above.

The functioning of optoelectronic apparatus 120 is shown schematically in FIG. 4, with optical rays 130 and 132 denoting the beams of optical radiation emitted by first and second emitters 126 and 128, respectively, and passed through the apparatus.

The beams are received through entrance face 42, with each first cylindrical lens 40 receiving one beam from one first emitter 126 and one beam from one second emitter 128. Projection optics 26 collimate the beams in the x- and y-directions as in FIGS. 1A-D, and project them through exit face 50 to polarizing beamsplitter 58. Beams from first emitters 126, depicted by optical rays 130, are reflected by polarizing beamsplitter 58 to first exit window 62 and are emitted through the window. Beams from second emitters 128, depicted by optical rays 132, are transmitted by polarizing beamsplitter 58 and reflected by partially-transmitting mirror 94 to second exit window 64 and are emitted through the window.

When controller 32 energizes only first emitters 126, only rays 130 are present, and optical radiation is emitted only through first exit window 62. Similarly, when controller 32 energizes only second emitters 128, only rays 132 are present, and optical radiation is emitted only through second exit window 64.

The compact size of optoelectronic apparatus 120 is indicated by a scale 134, wherein the length of the scale is 2 mm.

Although the disclosed embodiments refer to optical beams being emitted through the front face and the rear face of the enclosure, the polarization-based spatial multiplexer may be modified in a straightforward manner to emit the beams through other faces of the enclosure, such as through faces at right angles to each other or through two windows on the same face.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic apparatus, comprising:
   an array of edge-emitting laser diodes disposed on a common substrate and configured to emit respective beams of optical radiation in a direction parallel to a plane of the substrate; and
   projection optics, comprising:
      first cylindrical lenses, which have respective, mutually-parallel first cylinder axes that are perpendicular to the plane of the substrate, and which are aligned respectively with the emitters in the array so that each of the first cylindrical lenses receives and projects a single, respective one of the beams; and
      a second cylindrical lens, which has a second cylinder axis perpendicular to the first cylinder axes and is positioned adjacent to the first cylindrical lenses so as to receive and project all of the beams from the first cylindrical lenses.

2. The apparatus according to claim 1, wherein the projection optics are configured to project a uniform illumination.

3. The apparatus according to claim 1, wherein the projection optics are configured to project a patterned illumination.

4. The apparatus according to claim 1, wherein the first and second cylindrical lenses are configured to collimate the beams of optical radiation.

5. A method for projecting optical radiation, comprising:
   providing an array of edge-emitting laser diodes disposed on a common substrate and configured to emit respective beams of optical radiation in a direction parallel to a plane of the substrate;
   aligning first cylindrical lenses, which have respective, mutually-parallel first cylinder axes that are perpendicular to the plane of the substrate, with the emitters in the array so that each of the first cylindrical lenses receives and projects a single, respective one of the beams; and aligning a second cylindrical lens, which has a second cylinder axis perpendicular to the first cylinder axes, in a position adjacent to the first cylindrical lenses so as to receive and project all of the beams from the first cylindrical lenses.

6. The method according to claim 5, wherein aligning the first and second cylindrical lenses comprises configuring the lenses to project a uniform illumination.

7. The method according to claim 5, wherein aligning the first and second cylindrical lenses comprises configuring the lenses to project a patterned illumination.

8. The method according to claim 5, wherein aligning the first and second cylindrical lenses comprises configuring the lenses to collimate the beams of optical radiation.

* * * * *